United States Patent
Zhang et al.

(10) Patent No.: US 11,868,620 B2
(45) Date of Patent: Jan. 9, 2024

(54) READ-WRITE METHOD AND APPARATUS, ELECTRONIC DEVICE, AND READABLE MEMORY MEDIUM

(71) Applicant: INSPUR SUZHOU INTELLIGENT TECHNOLOGY CO., LTD., Jiangsu (CN)

(72) Inventors: Yu Zhang, Jiangsu (CN); Hongze Liu, Jiangsu (CN)

(73) Assignee: INSPUR SUZHOU INTELLIGENT TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 17/793,454

(22) PCT Filed: Jun. 24, 2020

(86) PCT No.: PCT/CN2020/098034
§ 371 (c)(1),
(2) Date: Jul. 18, 2022

(87) PCT Pub. No.: WO2021/143049
PCT Pub. Date: Jul. 22, 2021

(65) Prior Publication Data
US 2023/0117060 A1 Apr. 20, 2023

(30) Foreign Application Priority Data
Jan. 17, 2020 (CN) .......................... 202010052597.X

(51) Int. Cl.
*G06F 3/06* (2006.01)
(52) U.S. Cl.
CPC ............ *G06F 3/0613* (2013.01); *G06F 3/067* (2013.01); *G06F 3/0659* (2013.01)
(58) Field of Classification Search
CPC ....... G06F 3/0613; G06F 3/0659; G06F 3/067
See application file for complete search history.

(56) References Cited

U.S. PATENT DOCUMENTS 6,466,932 B1 * 10/2002 Dennis ................. H04L 63/104
709/227
10,296,517 B1 5/2019 Kumar et al.
(Continued)

FOREIGN PATENT DOCUMENTS

CN 1529243 A 9/2004
CN 101410905 A 4/2009
(Continued)

OTHER PUBLICATIONS

Microsoft, "Windows registry information for advanced users", Published Mar. 8, 2023. Https://learn.microsoft.com/en-us/troubleshoot/windows-server/performance/windows-registry-advanced-users. Retrieved Jun. 17, 2023 (Year: 2023).*
(Continued)

*Primary Examiner* — Nicholas J Simonetti
(74) *Attorney, Agent, or Firm* — Cooper Legal Group LLC

(57) ABSTRACT

Provided are a read-write method and apparatus, an electronic device, and a readable memory medium. The method includes: receiving a write instruction; determining a write policy corresponding to the write instruction according to read information in a registry, wherein the read information is information that, after a read instruction is received, corresponds to the read instruction and is stored in the registry; and executing the write instruction based on the write policy. It can be seen that, according to the present application, a registry is set, read information is registered in the registry when a read instruction is executed, a write policy corresponding to a write instruction is determined according to the read information in the registry before the write instruction is executed, and the write instruction is then executed based on the write policy. Therefore, the read-write processing efficiency is improved.

20 Claims, 4 Drawing Sheets

(56) References Cited

U.S. PATENT DOCUMENTS

| | | | | |
|---|---|---|---|---|
| 10,754,710 B1* | 8/2020 | Nguyen | ................ | G06F 9/542 |
| 2005/0289143 A1* | 12/2005 | Oshri | ................ | G06F 15/16 |
| 2012/0151110 A1 | 6/2012 | Pointon et al. | | |
| 2017/0090794 A1* | 3/2017 | Huang | ................ | G06F 12/0868 |

FOREIGN PATENT DOCUMENTS

| | | |
|---|---|---|
| CN | 105550567 A | 5/2016 |
| CN | 106933512 A | 7/2017 |
| CN | 107885456 A | 4/2018 |
| CN | 109032522 A | 12/2018 |
| CN | 109388645 A | 2/2019 |
| CN | 111261206 A | 6/2020 |
| EP | 2367100 A2 | 9/2011 |
| JP | 2006244191 A | 9/2006 |

OTHER PUBLICATIONS

Li, Zhiying, Ruini Xue, and Lixiang Ao. "Replichard: Towards tradeoff between consistency and performance for metadata." Proceedings of the 2016 International Conference on Supercomputing. 2016. (Year: 2016).*

Perez, Wilson J., et al. "A hybrid approach to the test of cache memory controllers embedded in SoCs." 2008 14th IEEE International On-Line Testing Symposium. IEEE, 2008. (Year: 2008).*

International Search Report and English Translation cited in PCT/CN2020/098034 dated Oct. 21, 2020, 5 pages.

Written Opinion and English Translation cited in PCT/CN2020/098034 dated Oct. 21, 2020, 10 pages.

First Office Action cited in CN202010052597.X, dated Jul. 9, 2021, 10 pages.

* cited by examiner

READ-WRITE METHOD AND APPARATUS, ELECTRONIC DEVICE, AND READABLE MEMORY MEDIUM

This application claims priority to Chinese Patent Application No. 202010052597.X, filed on Jan. 17, 2020, in China National Intellectual Property Administration and entitled "Read-Write Method and Apparatus, Electronic Device, and Readable Memory Medium", which is hereby incorporated by reference in its entirety.

FIELD

The present application relates to the technical field of read-write, and particularly to a read-write method, a read-write apparatus, an electronic device, and a computer-readable memory medium.

BACKGROUND

As a computer system, a network storage host includes a Central Processing Unit (CPU), a main board, a memory, a hard disk, and other hardware, and runs a Linux operating system. The network storage host may read and write the hard disk, but cannot read and write the hard disk at the same time. That is, the same address space of the hard disk cannot be read and written at the same time, otherwise data in the hard disk is inconsistent. Therefore, shared resource protection is needed for the hard disk. A common method is read-write lock rwlock, a set of standard method provided by Linux. That is, when this set of method is used, read and write are mutually exclusive, such that data inconsistency caused by reading and writing the same address space at the same time is avoided.

However, the hard disk in the network storage host is required to be read prior to be written. After multiple clients are connected with the network storage host, reading the hard disk requires short delays and immediate responses, usually much faster than writing, while writing the hard disk has low requirements for responses. The Linux standard resource lock rwlock sequentially performs processing for read and write. That is, if a write operation is performed first, all read operations may be performed only when the write operation is completed even if there are many read clients, which easily results in a relatively long read operation delay.

Therefore, how to provide a solution to the foregoing technical problem is a problem currently needed to be solved by those skilled in the art.

SUMMARY

An objective of the present application is to provide a read-write method, a read-write apparatus, an electronic device, and a computer-readable memory medium, which may improve the read-write processing efficiency. Specific solutions are as follows.

The present application provides a read-write method, including:
receiving a write instruction;
determining a write policy corresponding to the write instruction according to read information in a registry, wherein the read information is information that, after a read instruction is received, corresponds to the read instruction and is stored in the registry; and
executing the write instruction based on the write policy.

In a preferred embodiment, the step of determining the write policy corresponding to the write instruction according to read information in the registry includes:
determining whether there is any read information in the registry,
determining a first write policy in response to there being read information, and determining a second write policy in response to there being no read information.
Correspondingly, the step of executing the write instruction based on the write policy includes:
based on the first write policy, reading a region corresponding to the write instruction to a temporary memory, executing the write instruction in the temporary memory, and in response to read operations corresponding to all read information being completed and there being no more read information in the registry, writing all data in the temporary memory back to the region corresponding to the write instruction;
or, executing the write instruction in the region corresponding to the write instruction based on the second write policy.

In a preferred embodiment, before the step of receiving the write instruction, the method further includes:
receiving read instructions, each of the read instructions including read information;
storing the read information sequentially in the registry;
executing a read operation on data in a target region based on a target read instruction; and
in response to the read operation being completed, deleting the read information corresponding to the target read instruction from the registry, and executing the read operation on data in a region corresponding to a next read instruction based on the next read instruction until all the read instructions corresponding to the read information in the registry are completed.

In a preferred embodiment, after the step of executing the write instruction in the temporary memory, the method further includes:
determining, at a first preset time interval, whether there is any read information in the registry; and
in response to there being no read information in the registry, writing data on which the write instruction is executed in the temporary memory back to the region corresponding to the write instruction.

In a preferred embodiment, the registry further includes pointer information corresponding to each piece of read information, wherein the pointer information points to a next piece of read information from a current read information.
Correspondingly, the step of determining, at the first preset time interval, whether there is any read information in the registry includes:
determining, at the first preset time interval, whether last pointer information in the registry is null.
Correspondingly, the step of determining the second write policy in response to there being no read information includes:
in response to the last pointer information being null, determining the second write policy.

In a preferred embodiment, the step of determining the write policy corresponding to the write instruction according to read information in the registry includes:
determining whether there is target read information whose priority is greater than a preset priority threshold in the registry, and
in response to there being the target read information, determining a third write policy.

Correspondingly, the step of executing the write instruction based on the write policy includes:

based on the third write policy, reading the region corresponding to the write instruction to a temporary memory, and executing the write instruction in the temporary memory; and executing a read operation corresponding to the target read information, and in response to read operations corresponding to all target read information being completed, writing all data in the temporary memory back to the region corresponding to the write instruction.

In a preferred embodiment, the read information includes a data read address, a data read length, a data read timestamp, and a data read Identifier (ID).

Correspondingly, an execution process of the read operation includes:

determining, at a second preset time interval based on the data read timestamp, whether read time of data read in the read operation exceeds a preset threshold; and in response to the read time exceeding the preset threshold, stopping the data read operation, deleting the corresponding read information in the registry, and determining that the read operation is completed.

In a preferred embodiment, after the step of executing the write instruction based on the write policy, the method further includes:

determining, at a third preset time interval, whether write time of a write operation corresponding to a current write instruction is greater than a preset write time threshold; and in response to the write time being greater than the preset write time threshold, stopping the write operation, and sending out warning information.

The present application provides a read-write apparatus, including:

a write instruction receiving module, configured to receive a write instruction;

a write policy determination module, configured to determine a write policy corresponding to the write instruction according to read information in a registry, wherein the read information is information that, after a read instruction is received, corresponds to the read instruction and is stored in the registry; and a write instruction execution module, configured to execute the write instruction based on the write policy.

The present application provides an electronic device, including:

a memory, configured to store computer program; and a processor, configured to execute the computer program to implement steps of the read-write method as described above.

The present application provides a computer-readable memory medium, storing computer program that is executed by a processor to implement steps of the read-write method as described above.

The present application provides a read-write method, including: receiving a write instruction; determining a write policy corresponding to the write instruction according to read information in a registry, wherein the read information is information that, after a read instruction is received, corresponds to the read instruction and is stored in the registry; and executing the write instruction based on the write policy.

It can be seen that, according to the present application, a registry is set, read information is registered in the registry when a read instruction is executed, a write policy corresponding to a write instruction is determined according to the read information in the registry before the write instruction is executed, and the write instruction is then executed based on the write policy. Therefore, the read-write processing efficiency is improved.

The present application also provides a read-write apparatus, an electronic device, and a computer-readable memory medium, all of which have the foregoing beneficial effects. Elaborations are omitted herein.

BRIEF DESCRIPTION OF THE DRAWINGS

In order to describe the technical solutions in embodiments of the present application or the prior art more clearly, the drawings required to be used in descriptions about the embodiments or the prior art will be introduced briefly below. Apparently, the drawings in the description below are only the embodiments of the present application. Those ordinarily skilled in the art may further obtain other drawings according to the provided drawings without creative work.

DETAILED DESCRIPTION

In order to make the objective, technical solutions, and advantages of the embodiments of the present application clearer, the technical solutions in the embodiments of the present application will be described clearly and completely below in combination with the drawings in the embodiments of the present application. Clearly, the described embodiments are not all but part of embodiments of the present application. All other embodiments obtained by those ordinarily skilled in the art based on the embodiments in the present application without creative work shall fall within the scope of protection of the present application.

Figure 1:
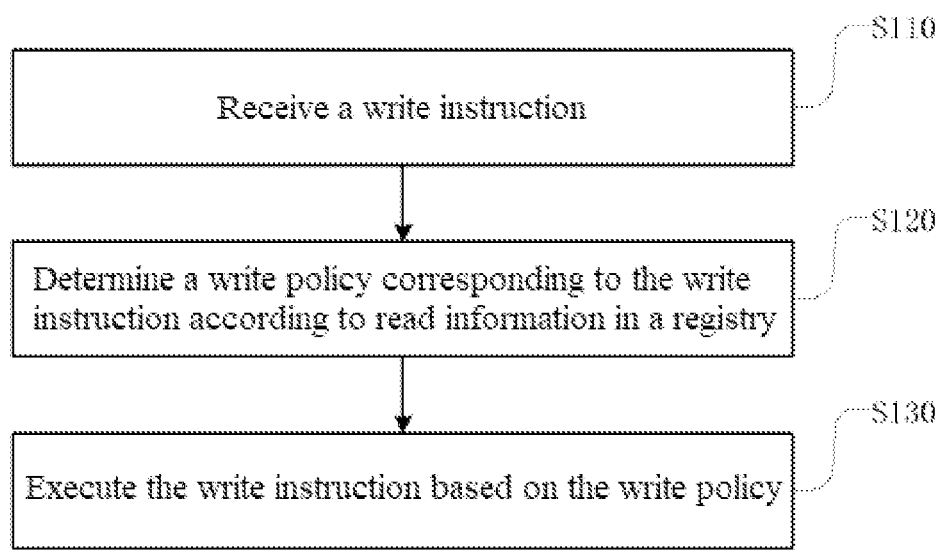
FIG. 1 is a flowchart of a read-write method according to an embodiment of the present application.

In the related art, a Linux standard resource lock rwlock sequentially performs processing for read and write. That is, if a write operation is performed first, all read operations may be performed only when the write operation is completed even if there are many read clients, which easily results in a relatively long read operation delay. Based on the foregoing technical problem, the present embodiment provides a read-write method, specifically referring to FIG. 1. FIG. 1 is a flowchart of a read-write method according to an embodiment of the present application. The following steps are specifically included.

In S110, a write instruction is received.

The present embodiment is based on a network storage host. The network storage host includes a CPU, a main board, a memory, a hard disk, and other hardware, and runs a Linux operating system.

A purpose of this step is to receive a write instruction. It can be understood that the write instruction includes a write address, i.e., a region corresponding to the write instruction.

In S120, a write policy corresponding to the write instruction is determined according to read information in a registry.

The read information is information that, after a read instruction is received, corresponds to the read instruction and is stored in the registry.

Figure 2:
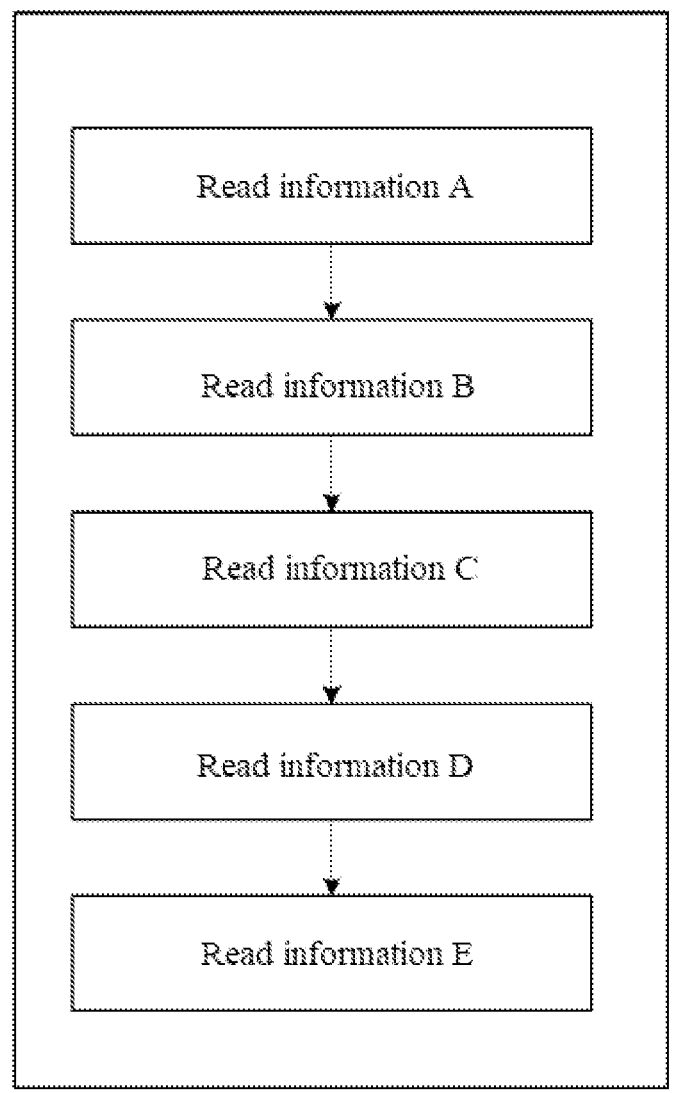
FIG. 2 is a schematic diagram of an information structure in a registry according to an embodiment of the present application.

Referring to FIG. 2, FIG. 2 is a schematic diagram of an information structure in a registry according to an embodiment of the present application. The read information registry is implemented by a singly linked list.

The write policy is not limited in the present embodiment. In a possible implementation mode, the write policy corresponding to the write instruction may be determined according to the read information in the registry in a manner of: determining whether there is any read information in the registry; if YES, determining a first write policy; and if NO, determining a second write policy. The first write policy is: reading a region corresponding to the write instruction to a temporary memory, executing the write instruction in the temporary memory, and when read operations corresponding to all read information are completed and there is no more read information in the registry, writing all data in the temporary memory back to the region corresponding to the write instruction. The second write policy is: executing the write instruction in a region corresponding to the write instruction.

In another possible implementation mode, the write policy corresponding to the write instruction may be determined according to the read information in the registry in a manner of: determining whether there is any target read information whose priority is greater than a preset priority threshold in the registry; if there is the target read information, determining a third write policy; and if there is not the target read information, determining a fourth write policy. The third write policy is: reading a region corresponding to the write instruction to a temporary memory, and executing the write instruction in the temporary memory; and executing a read operation corresponding to the target read information, and when read operations corresponding to all target read information are completed, writing all data in the temporary memory back to the region corresponding to the write instruction. The fourth write policy is: executing the write instruction in a region corresponding to the write instruction.

In another possible implementation mode, the write policy corresponding to the write instruction may be determined according to the read information in the registry in a manner of: determining a priority of a first piece of read information in the registry; comparing the priority with a priority of the write instruction; if the priority of the write instruction is higher than that of the first piece of read information, determining a fifth write policy; and if the priority of the write instruction is lower than that of the first piece of read information, determining a sixth write policy. The fifth write policy is: executing the write instruction in a region corresponding to the write instruction. The sixth write policy is: reading a region corresponding to the write instruction to a temporary memory, executing the write instruction in the temporary memory, and executing a read operation corresponding to the first piece of read information; when the read operation is completed, deleting the first piece of read information, and then executing the step of determining a priority of a first piece of read information in the registry by taking a next piece of read information as a new first piece of read information; and when a priority corresponding to the first piece of read information is lower than that of the write instruction, writing all data in the temporary memory back to the region corresponding to the write instruction.

In S130, the write instruction is executed based on the write policy.

Further, after step S130, the method further includes that: whether write time of a write operation corresponding to the current write instruction is greater than a preset write time threshold is determined at a third preset time interval; and if the write time is greater than the preset write time threshold, the write operation is stopped, and warning information is sent out.

In this step, whether write time of a write operation corresponding to the current write instruction is greater than a preset write time threshold is determined at a third preset time interval, for a purpose of limiting the write time within a certain range, thereby ensuring high efficiency of subsequent write operations and read operations. If the write time is greater than the preset write time threshold, the write operation is stopped, and warning information is sent out. If the write time is less than the preset write time threshold, the write operation is continued.

Based on the above technical solution in the present embodiment, a registry is set, read information is registered in the registry when a read instruction is executed, a write policy corresponding to a write instruction is determined according to the read information in the registry before the write instruction is executed, and the write instruction is then executed based on the write policy. Therefore, the read-write processing efficiency is improved.

Figure 3:
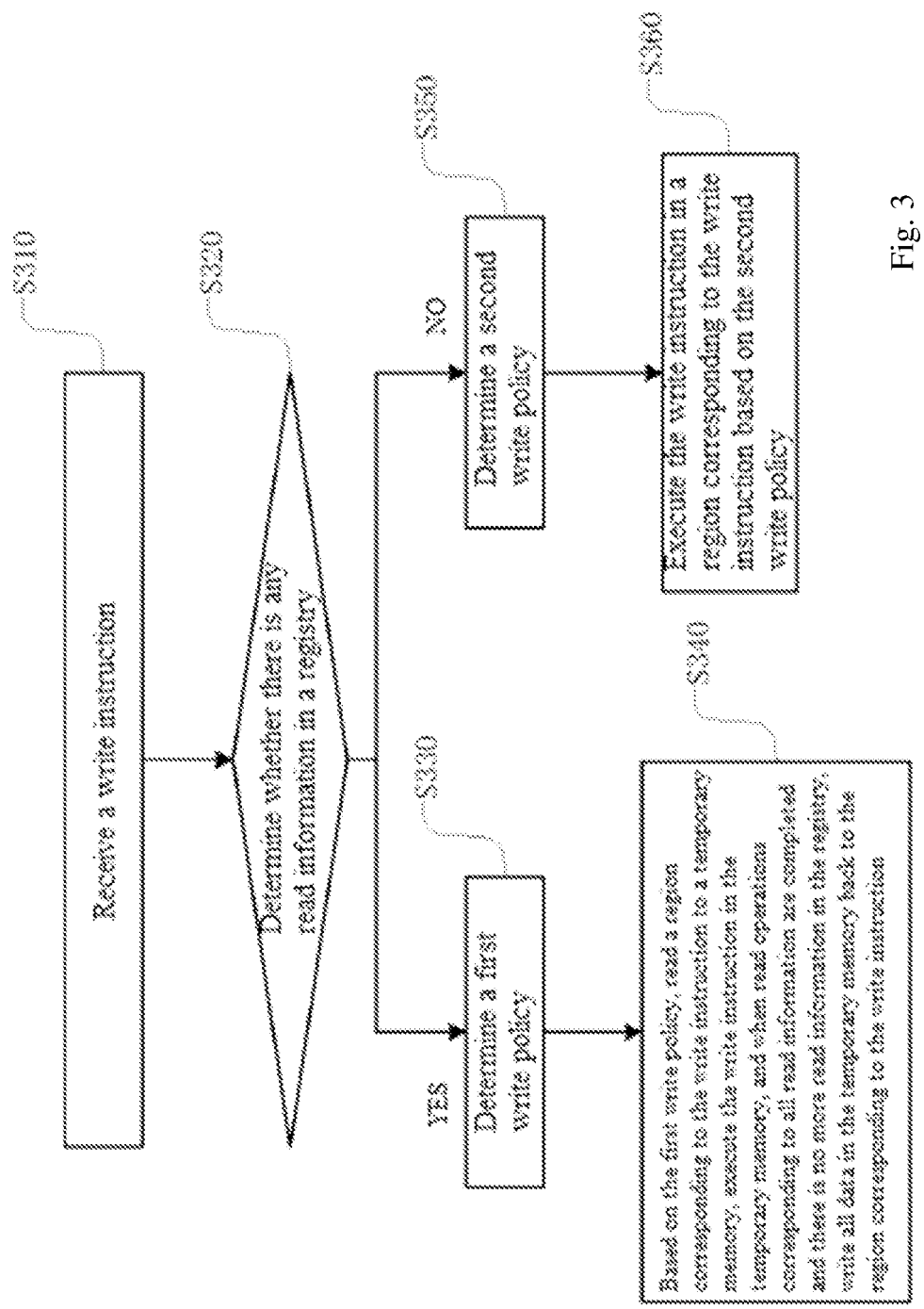
FIG. 3 is a schematic flowchart of another read-write method according to an embodiment of the present application.

Based on the above-mentioned embodiment, referring to FIG. 3, FIG. 3 is a schematic flowchart of another read-write method according to an embodiment of the present application, including the following steps.

In S310, a write instruction is received.

Further, before the step S310, the method further includes that: read instructions are received, each of the read instructions including read information; the read information is stored sequentially in a registry; a read operation is executed on data in a target region based on a target read instruction; and when the read operation is completed, the read information corresponding to the target read instruction is deleted from the registry, and a read operation is executed on data in a region corresponding to a next read instruction based on the next read instruction until all the read instructions corresponding to the read information in the registry are completed.

Specifically, the read information includes a data read address, a data read length, a data read timestamp, a data read ID, and pointer information, specifically referring to Table 1, wherein Address represents the data read address, Length represents the data read length, Timestamp represents the data read timestamp, Name represents the data read ID, NEXT represents the pointer information for pointing to a next piece of read information, thereby forming a singly linked list.

TABLE 1

| Read Information | | |
|---|---|---|
| Field | Size | Meaning |
| Address | 8 bytes | Address of data being read |
| Length | 4 bytes | Length of data being read |

TABLE 1-continued

Read Information

| Field | Size | Meaning |
|---|---|---|
| Timestamp | 8 bytes | Data read starting timestamp, used for calculating and determining time occupied by the read operation |
| Name | 32 bytes | Name of the data reader, used for displaying current read operations |
| Next | 4 bytes | Pointing to the next piece of read information, thereby forming a singly linked list |

It can be understood that a memory size of each piece of read information in the registry is at least 56 bytes. In some possible implementation modes, the read information may further include Priority, i.e., an operation priority, for determining whether a write operation is allowed. In such case, a memory size of a piece of read information in the registry is 57 bytes.

When at least one read instruction is received (the read instruction may be received at the same time or sequentially), corresponding read information is stored sequentially in the registry.

In S320, whether there is any read information in a registry is determined.

The read information is information that, after a read instruction is received, corresponds to the read instruction and is stored in the registry. The registry includes read information. It can be understood that each piece of read information corresponds to a read instruction, and when the read instruction is completed, the read information is deleted from the registry. Therefore, the read information in the registry is all unprocessed read information. If there is read information in the registry, step S330 is performed. If there is no read information in the registry, step S350 is performed.

Referring to FIG. 2, the read information registry is implemented by a singly linked list. When read operation A corresponding to read instruction A corresponding to read information A is completed, read operation B corresponding to read information B is executed. When read operation B is completed, read operation C corresponding to read information C is executed. When read operation C is completed, read operation D corresponding to read information is executed. When read operation D is completed, read operation E corresponding to read information E is executed. When read operation E is completed, a write operation corresponding to the write instruction is executed.

In S330, a first write policy is determined if there is read information.

In S340, based on the first write policy, a region corresponding to the write instruction is read to a temporary memory, the write instruction is executed in the temporary memory, and when read operations corresponding to all read information are completed and there is no more read information in the registry, all data in the temporary memory is written back to the region corresponding to the write instruction.

A region corresponding to the write instruction is read to a temporary memory, and the write instruction is executed in the temporary memory. It can be understood that, a read instruction is received while, before or after receiving the write instruction, and read information corresponding to the read instruction is stored in the registry. In such case, the write instruction is executed after read instructions corresponding to all read information in the registry are completed.

For example, if there is a first piece of read information in the registry, and a write instruction is received when a read instruction corresponding to the read information is not completed, a region corresponding to the write instruction is read to a temporary memory, and the write instruction is executed in the temporary memory. Meanwhile, if a second read instruction is received when the first read instruction is not completed, read information corresponding to the second read instruction is stored in the registry. When the first read instruction is completed, the corresponding read information is deleted from the registry, and the second read instruction is executed. When there is no more read information in the registry, data corresponding to the write instruction in the temporary memory is written back to the region corresponding to the write instruction. It can be understood that, if another write instruction is received when read instructions are not completely executed, the write instruction is delayed, and the write instruction is executed when a write operation corresponding to a previous write instruction is completed.

Further, after the operation that the write instruction is executed in the temporary memory, the method further includes that: whether there is any read information in the registry is determined at a first preset time interval; and if there is no read information in the registry, data on which the write instruction is executed in the temporary memory is written back to the region corresponding to the write instruction.

Further, the registry further includes pointer information corresponding to each piece of read information, wherein the pointer information points to a next piece of read information from the current read information. Correspondingly, the operation that whether there is any read information in the registry is determined at a first preset time interval includes that: whether last pointer information in the registry is null is determined at the first preset time interval. Correspondingly, the operation that a second write policy is determined if there is no read information includes that: if the last pointer information is null, the second write policy is determined.

The pointer information is in size of 4 bytes, and points to a next piece of read information, thereby forming a singly linked list, i.e., the registry. It can be understood that, after the write instruction is received, whether there is any more read information in the registry is determined. A specific determining method may be determining whether last pointer information in the registry is null. If YES, it indicates that there is registered no more read information. In such case, a second write policy is determined, and a write operation may be executed directly on a corresponding data region of a hard disk. If NO, a first write policy is determined. In such case, the corresponding region of the hard disk is read to the temporary memory, and data therein is modified. That is, the region corresponding to the write instruction is read to the temporary memory, and the write instruction is executed in the temporary memory. After the operation corresponding to the write instruction is completed in the temporary memory, whether last pointer information in the registry is null is checked once at a first preset time interval, i.e., 50 ms. When the last pointer information is null, it indicates that there is locked no read information, and all data in the temporary memory is written back to the region corresponding to the write instruction.

In S350, a second write policy is determined if there is no read information.

In S360, the write instruction is executed in a region corresponding to the write instruction based on the second write policy.

Further, the method further includes that: a query instruction is received; and the read information in the registry is queried based on the query instruction. It can be understood that each piece of read information in the registry may be printed through the query instruction. The read information includes a data read address, a data read length, a data read timestamp, and a data read ID, i.e., an initiator name. Read starting time, read time, and other information may be obtained according to the timestamp.

The present disclosure proposes a technical method for designing a Linux read-first hard disk protection lock on a network storage host. The method is divided into totally three parts: data structure, read operation processing, and write operation processing, and the processing efficiency of read-before-write applications may be improved. Data structure refers to a processing flow of each piece of read information in a registry. A flow of the read-write method includes the following operations. An information registry is set, and when a read instruction is received for a read operation, information is registered in the registry, namely read information corresponding to the read instruction is stored in the registry. When a write instruction is received and a write operation is executed, if there is still read information in the registry, a content of a hard disk is read first, namely a region corresponding to the write instruction is read first to a temporary memory, and the write instruction is executed in the temporary memory. Then, whether there is any read information in the registry is determined. If NO, it is determined that there is no read operation, and the hard disk is written. If YES, it is determined that there is a read operation occupying the hard disk and the write operation needs to be delayed, and when there is no read operation, the hard disk is written.

Based on the above technical solution in the present embodiment, a registry is set, read information is registered in the registry when a read instruction is executed, a write instruction is directly executed if there is no read information in the registry before a write instruction is executed, and if there is read information in the registry, an operation is delayed, and the write instruction is executed in a temporary memory. When there are read and write instructions at the same time, a requirement for fast read is met, and the read instruction processing efficiency is improved.

Figure 4:
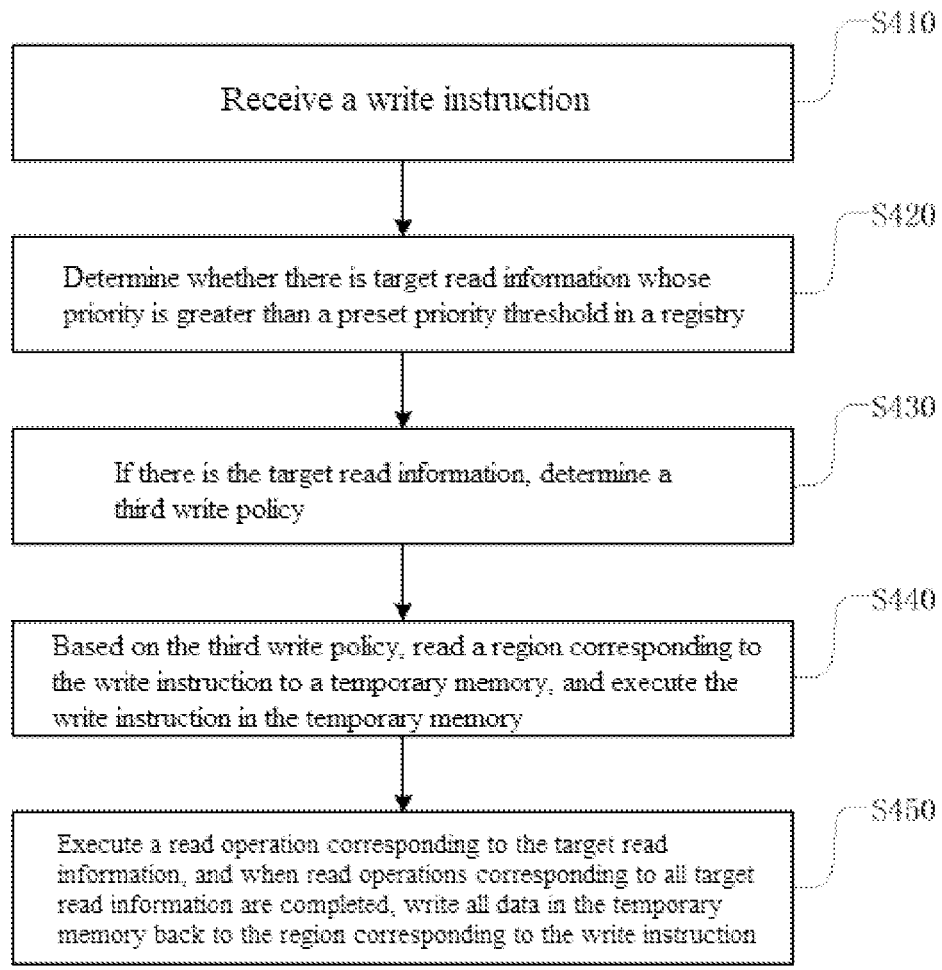
FIG. 4 is a schematic flowchart of another read-write method according to an embodiment of the present application.

Based on the above-mentioned embodiments, referring to FIG. 4, FIG. 4 is a schematic flowchart of another read-write method according to an embodiment of the present application, including the following steps.

In S410, a write instruction is received.

In S420, whether there is target read information whose priority is greater than a preset priority threshold in a registry is determined.

Read information is stored sequentially in the registry. The read information includes a data read address, a data read length, a data read timestamp, a data read ID, and an operation priority. A corresponding priority is set for each read operation. When the priority is greater than a preset priority threshold, the target read information needs to be executed preferentially. When there is the target read information in the registry, step S430 is performed. When there is not the target read information in the registry, the write instruction is executed in a region corresponding to the write instruction.

In S430, if there is the target read information, a third write policy is determined.

The read information is information that, after a read instruction is received, corresponds to the read instruction and is stored in the registry.

In S440, based on the third write policy, a region corresponding to the write instruction is read to a temporary memory, and the write instruction is executed in the temporary memory.

In S450, a read operation corresponding to the target read information is executed, and when read operations corresponding to all target read information are completed, all data in the temporary memory is written back to the region corresponding to the write instruction.

Based on the above technical solution in the present embodiment, priorities are set for read operations, and the read operation corresponding to read information whose priority is greater than a preset priority threshold may be completed preferentially. Therefore, high efficiency of read operations of clients is ensured.

Based on the above-mentioned embodiments, the read information includes a data read address, a data read length, a data read timestamp, and a data read ID. Correspondingly, an execution process of the read operation includes that: whether read time of data read in the read operation exceeds a preset threshold is determined at a second preset time interval based on the data read timestamp; and if the read time exceeds the preset threshold, the data read operation is stopped, the corresponding read information in the registry is deleted, and it is determined that the read operation is completed.

The second preset time interval is not limited in the present embodiment, and may be 50 ms. The read time of data read may be determined based on the timestamp. When the read time exceeds the preset threshold, read is unlocked, the read instruction is no more executed, and it is determined that the read instruction is completed. The read time is not limited in the present embodiment, and may be 500 ms. Further, when the read time exceeds the preset threshold, an alarm may further be given. An alarming mode is not limited in the present embodiment, and may be customized by a user.

A memory for read information is requested, a data read address, a data read length, a data read timestamp, and a reader name form the read information, and then the read information is inserted into the singly linked list, i.e., the registry. This process is read Lock. Hard disk data is read according to the read instruction. When data read is completed, corresponding read information in the registry is deleted, and the requested memory is released. This process is read Unlock. Read management thread is as follows: there is globally a read management thread. The thread performs polling once at a second preset time interval, i.e., 50 ms, to check each piece of read information in the registry, and if read time corresponding to the read information exceeds a set global read time threshold, i.e., the preset threshold (this value is configurable, and defaults to 500 ms), gives an alarm and unlocks the read operation. The read operation is not allowed to be unlocked indefinitely.

After data read is completed, the read information corresponding to the target read instruction is deleted from the registry, and the step of performing data read on data in a region corresponding to a next read instruction based on the next read instruction is performed until all the read instructions in the registry are completed.

Figure 5:
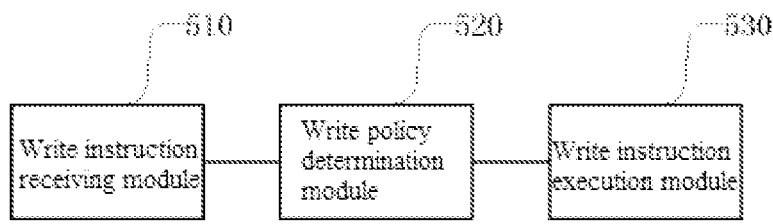
FIG. 5 is a schematic structural diagram of a read-write apparatus according to an embodiment of the present application.

A read-write apparatus provided in the embodiments of the present application will now be introduced. The read-write apparatus described below and the above-described read-write method may correspondingly refer to each other. Referring to FIG. 5, FIG. 5 is a schematic structural diagram of a read-write apparatus according to an embodiment of the present application, including:

a write instruction receiving module 510, configured to receive a write instruction;

a write policy determination module 520, configured to determine a write policy corresponding to the write instruction according to read information in a registry, wherein the read information is information that, after a read instruction is received, corresponds to the read instruction and is stored in the registry; and a write instruction execution module 530, configured to execute the write instruction based on the write policy.

In some specific embodiments, the write policy determination module 520 includes:

a judgment unit, configured to determine whether there is any read information in a registry; and a write policy determination unit, configured to, if there is read information, determine a first write policy; if there is no read information, determine a second write policy.

Correspondingly, the write instruction execution module 530 includes:

a first execution unit, configured to, based on the first write policy, read a region corresponding to the write instruction to a temporary memory, execute the write instruction in the temporary memory, and when read operations corresponding to all read information are completed and there is no more read information in the registry, write all data in the temporary memory back to the region corresponding to the write instruction; and a second execution unit, configured to execute the write instruction in a region corresponding to the write instruction based on the second write policy.

In some specific embodiments, the apparatus further includes:

a read instruction receiving module, configured to receive read instructions, each of the read instructions including read information;

a storage module, configured to store the read information sequentially in the registry;

a reading module, configured to execute a read operation on data in a target region based on a target read instruction; and a deletion and data reading module, configured to, when the read operation is completed, delete the read information corresponding to the target read instruction from the registry, and execute a read operation on data in a region corresponding to a next read instruction based on the next read instruction until all the read instructions corresponding to the read information in the registry are completed.

In some specific embodiments, the apparatus further includes:

a judgment module, configured to determine, at a first preset time interval, whether there is any read information in the registry; and a write module, configured to, if there is no read information in the registry, write data on which the write instruction is executed in the temporary memory back to the region corresponding to the write instruction.

In some specific embodiments, the registry further includes pointer information corresponding to each piece of read information, wherein the pointer information points to a next piece of read information from the current read information.

Correspondingly, the judgment module includes:

a judgment unit, configured to determine, at the first preset time interval, whether last pointer information in the registry is null.

Correspondingly, the write policy determination unit includes:

a write policy determination subunit, configured to, if the last pointer information is null, determine the second write policy.

In some specific embodiments, the write policy determination module 520 includes:

a judgment unit, configured to determine whether there is target read information whose priority is greater than a preset priority threshold in a registry; and a third write policy determination unit, configured to, if there is the target read information, determine a third write policy.

Correspondingly, the write instruction execution module includes:

a first write unit, configured to, based on the third write policy, read a region corresponding to the write instruction to a temporary memory, and execute the write instruction in the temporary memory; and a second write unit, configured to execute a read operation corresponding to the target read information, and when read operations corresponding to all target read information are completed, write all data in the temporary memory back to the region corresponding to the write instruction.

In some specific embodiments, the read information includes a data read address, a data read length, a data read timestamp, and a data read ID.

Correspondingly, an execution process of the read operation includes:

a read time judgment module, configured to determine, at a second preset time interval based on the data read timestamp, whether read time of data read in the read operation exceeds a preset threshold; and a read operation execution module, configured to, if the read time exceeds the preset threshold, stop the data read operation, delete the corresponding read information from the registry, and determine that the read operation is completed.

In some specific embodiments, the apparatus further includes:

a write time judgment module, configured to determine, at a third preset time interval, whether write time of a write operation corresponding to the current write instruction is greater than a preset write time threshold; and a write operation stopping and warning module, configured to, if the write time is greater than the preset write time threshold, stop the write operation, and send out warning information.

The embodiment of the read-write apparatus is in mutual correspondence with the embodiment of the read-write method. Therefore, the embodiment of the read-write apparatus refers to the descriptions about the embodiment of the read-write method, and will not be elaborated temporarily herein.

An electronic device provided in the embodiments of the present application will now be introduced. The electronic device described below and the above-described read-write method may correspondingly refer to each other.

The present embodiment provides an electronic device, including:

a memory, configured to store computer program; and a processor, configured to execute the computer program to implement the steps of the read-write method as described above.

The embodiment of the electronic device is in mutual correspondence with the embodiment of the read-write method. Therefore, the embodiment of the electronic device refers to the descriptions about the embodiment of the read-write method, and will not be elaborated temporarily herein.

A computer-readable memory medium provided in the embodiments of the present application will now be introduced. The computer-readable memory medium described below and the above-described read-write method may correspondingly refer to each other.

The present embodiment provides a computer-readable memory medium, storing computer program that is executed by a processor to implement the steps of the read-write method as described above.

The embodiment of the computer-readable memory medium is in mutual correspondence with the embodiment of the read-write method. Therefore, the embodiment of the computer-readable memory medium refers to the descriptions about the embodiment of the read-write method, and will not be elaborated temporarily herein.

Each embodiment in the specification is described progressively. Descriptions made in each embodiment focus on differences with the other embodiments, and the same or similar parts in each embodiment refer to the other embodiments. The apparatus disclosed in the embodiments corresponds to the method disclosed in the embodiments, and thus is described relatively briefly, and related parts refer to part of descriptions about the method.

Professionals may further realize that the units and algorithm steps of each example described in combination with the embodiments disclosed herein may be implemented by electronic hardware, computer software, or a combination thereof. In order to describe the interchangeability of hardware and software clearly, the compositions and steps of each example have been described generally in the foregoing descriptions according to functions. Whether these functions are executed by hardware or software depends on specific applications and design constraints of the technical solutions. Professionals may realize the described functions for each specific application by use of different methods, but such realization shall fall within the scope of the present application.

The steps of the method or algorithm described in combination with the embodiments disclosed herein may directly be implemented by hardware, a software module executed by the processor, or a combination thereof. The software module may be arranged in a Random Access Memory (RAM), an internal memory, a Read-Only Memory (ROM), an electrically programmable ROM, an electrically erasable programmable ROM, a register, a hard disk, a removable disk, a Compact Disc Read-Only Memory (CD-ROM), or a memory medium in any other form well known in this art.

The read-write method, apparatus, and device and computer-readable memory medium provided in the present application are introduced above in detail. The principle and implementation modes of the present application are described herein with specific examples, and the descriptions about the above embodiments are only for helping in understanding the method and core idea of the present application. It is to be pointed out that those ordinarily skilled in the art may further make a plurality of improvements and embellishments to the present application without departing from the principle of the present application, and these improvements and embellishments shall also fall within the scope of protection of the claims of the present application.

What is claimed is:

1. A read-write method, comprising:
receiving a write instruction;
determining a write policy corresponding to the write instruction according to read information in a global registry, wherein the read information is information that, after a read instruction is received, corresponds to the read instruction and is stored in the global registry, wherein the step of determining the write policy corresponding to the write instruction according to the read information in the global registry comprises:
determining whether there is any read information in the global registry; and
determining a first write policy in response to there being read information in the global registry; and
executing the write instruction based on the write policy, wherein the step of executing the write instruction based on the write policy comprises:
based on the first write policy, reading a region corresponding to the write instruction to a temporary memory, executing the write instruction in the temporary memory, and in response to read operations corresponding to all read information in the global registry being completed and there being no more read information in the global registry, writing all data in the temporary memory back to the region corresponding to the write instruction.

2. The read-write method according to claim 1, wherein the step of determining the write policy corresponding to the write instruction according to the read information in the global registry comprises:
determining a second write policy in response to there being no read information in the global registry;
correspondingly, the step of executing the write instruction based on the write policy comprises:
executing the write instruction in the region corresponding to the write instruction based on the second write policy.

3. The read-write method according to claim 2, wherein before the step of receiving the write instruction, the method further comprises:
receiving read instructions, each of the read instructions comprising read information;
storing the read information sequentially in the global registry;
executing a read operation on data in a target region based on a target read instruction; and
in response to the read operation being completed, deleting the read information corresponding to the target read instruction from the global registry, and executing the read operation on data in a region corresponding to a next read instruction based on the next read instruction until all the read instructions corresponding to the read information in the global registry are completed.

4. The read-write method according to claim 3, wherein the read information comprises a data read address, a data read length, a data read timestamp, and a data read Identifier (ID);
correspondingly, an execution process of the read operation comprises:

determining, at a second preset time interval based on the data read timestamp, whether read time of data read in the read operation exceeds a preset threshold; and in response to the read time exceeding the preset threshold, stopping the read operation, deleting corresponding read information in the global registry, and determining that the read operation is completed.

5. The read-write method according to claim 2, wherein after the step of executing the write instruction in the temporary memory, the method further comprises:

determining, at a first preset time interval, whether there is any read information in the global registry; and in response to there being no read information in the global registry, writing data on which the write instruction is executed in the temporary memory back to the region corresponding to the write instruction.

6. The read-write method according to claim 5, wherein the global registry further comprises pointer information corresponding to each piece of read information in the global registry, wherein the pointer information points to a next piece of read information in the global registry from a current read information;

correspondingly, the step of determining, at the first preset time interval, whether there is any read information in the global registry comprises:

determining, at the first preset time interval, whether last pointer information in the global registry is null; and correspondingly, the step of determining the second write policy in response to there being no read information in the global registry comprises:

in response to the last pointer information being null, determining the second write policy.

7. The read-write method according to claim 6, wherein the read information comprises a data read address, a data read length, a data read timestamp, and a data read Identifier (ID);

correspondingly, an execution process of the read operation comprises:

determining, at a second preset time interval based on the data read timestamp, whether read time of data read in the read operation exceeds a preset threshold; and in response to the read time exceeding the preset threshold, stopping the read operation, deleting corresponding read information in the global registry, and determining that the read operation is completed.

8. The read-write method according to claim 5, wherein the read information comprises a data read address, a data read length, a data read timestamp, and a data read Identifier (ID);

correspondingly, an execution process of the read operation comprises:

determining, at a second preset time interval based on the data read timestamp, whether read time of data read in the read operation exceeds a preset threshold; and in response to the read time exceeding the preset threshold, stopping the read operation, deleting corresponding read information in the global registry, and determining that the read operation is completed.

9. The read-write method according to claim 5, wherein the first preset time interval is 50 ms.

10. The read-write method according to claim 2, wherein the read information comprises a data read address, a data read length, a data read timestamp, and a data read Identifier (ID);

correspondingly, an execution process of the read operation comprises:

determining, at a second preset time interval based on the data read timestamp, whether read time of data read in the read operation exceeds a preset threshold; and in response to the read time exceeding the preset threshold, stopping the read operation, deleting corresponding read information in the global registry, and determining that the read operation is completed.

11. The read-write method according to claim 1, wherein the step of determining the write policy corresponding to the write instruction according to the read information in the global registry comprises:

determining whether there is target read information whose priority is greater than a preset priority threshold in the global registry, and in response to there being the target read information, determining a third write policy;

correspondingly, the step of executing the write instruction based on the write policy comprises:

based on the third write policy, reading the region corresponding to the write instruction to the temporary memory, and executing the write instruction in the temporary memory; and executing a read operation corresponding to the target read information, and in response to read operations corresponding to all target read information being completed, writing all data in the temporary memory back to the region corresponding to the write instruction.

12. The read-write method according to claim 11, wherein the read information comprises a data read address, a data read length, a data read timestamp, and a data read Identifier (ID);

correspondingly, an execution process of the read operation comprises:

determining, at a second preset time interval based on the data read timestamp, whether read time of data read in the read operation exceeds a preset threshold; and in response to the read time exceeding the preset threshold, stopping the read operation, deleting corresponding read information in the global registry, and determining that the read operation is completed.

13. The read-write method according to claim 1, wherein after the step of executing the write instruction based on the write policy, the method further comprises:

determining, at a third preset time interval, whether write time of a write operation corresponding to a current write instruction is greater than a preset write time threshold; and in response to the write time being greater than the preset write time threshold, stopping the write operation, and sending out warning information.

14. The read-write method according to claim 13, wherein the write operation is continued in response to the write time being less than the preset write time threshold.

15. The read-write method according to claim 1, wherein the read information includes an operation priority, for determining whether a write operation is allowed.

16. The read-write method according to claim 1, wherein the step of determining the write policy corresponding to the write instruction according to the read information in the global registry, comprises:
   determining a priority of a first piece of the read information in the global registry;
   comparing the priority with a priority of the write instruction; and
   in response to the priority of the write instruction being higher than the priority of the first piece of the read information, determining a fifth write policy.

17. The read-write method according to claim 1, wherein the step of determining the write policy corresponding to the write instruction according to the read information in the global registry, comprises:
   determining a priority of a first piece of the read information in the global registry;
   comparing the priority with a priority of the write instruction; and
   in response to the priority of the write instruction being lower than the priority of the first piece of the read information, determining a sixth write policy.

18. The read-write method according to claim 17, wherein the sixth write policy comprises:
   reading the region corresponding to the write instruction to the temporary memory, executing the write instruction in the temporary memory, and executing a read operation corresponding to the first piece of the read information;
   in response to the read operation being completed, deleting the first piece of the read information, and then executing the step of determining the priority of the first piece of the read information in the global registry by taking a next piece of the read information as a new first piece of the read information; and
   in response to a priority of the first piece of the read information being lower than the priority of the write instruction, writing all data in the temporary memory back to the region corresponding to the write instruction.

19. An electronic device, comprising:
   a memory, configured to store a computer program; and
   a processor, configured to execute the computer program to implement steps of:
      receiving a write instruction;
      determining a write policy corresponding to the write instruction according to read information in a global registry, wherein the read information is information that, after a read instruction is received, corresponds to the read instruction and is stored in the global registry, wherein the step of determining the write policy corresponding to the write instruction according to the read information in the global registry comprises:
         determining whether there is any read information in the global registry; and
         determining a first write policy in response to there being read information in the global registry; and
      executing the write instruction based on the write policy, wherein the step of executing the write instruction based on the write policy comprises:
         based on the first write policy, reading a region corresponding to the write instruction to a temporary memory, executing the write instruction in the temporary memory, and in response to read operations corresponding to all read information in the global registry being completed and there being no more read information in the global registry, writing all data in the temporary memory back to the region corresponding to the write instruction.

20. A non-transitory computer-readable memory medium, storing a computer program that is executed by a processor to implement steps of:
   receiving a write instruction;
   determining a write policy corresponding to the write instruction according to read information in a global registry, wherein the read information is information that, after a read instruction is received, corresponds to the read instruction and is stored in the global registry, wherein the step of determining the write policy corresponding to the write instruction according to the read information in the global registry comprises:
      determining whether there is any read information in the global registry; and
      determining a first write policy in response to there being read information in the global registry; and
   executing the write instruction based on the write policy, wherein the step of executing the write instruction based on the write policy comprises:
      based on the first write policy, reading a region corresponding to the write instruction to a temporary memory, executing the write instruction in the temporary memory, and in response to read operations corresponding to all read information in the global registry being completed and there being no more read information in the global registry, writing all data in the temporary memory back to the region corresponding to the write instruction.

* * * * *